United States Patent [19]
Parks et al.

[11] Patent Number: 5,247,630
[45] Date of Patent: Sep. 21, 1993

[54] M-DIMENSIONAL COMPUTER MEMORY WITH M-1 DIMENSIONAL HYPERPLANE ACCESS

[75] Inventors: Allen D. Parks; James C. Perry, both of Fredericksburg; Albert P. Shuler, King George, all of Va.

[73] Assignee: The United States of America as represented by the Secretary of the Navy, Washington, D.C.

[21] Appl. No.: 551,103

[22] Filed: Jul. 9, 1990

[51] Int. Cl.$^5$ .............................................. G06F 12/02
[52] U.S. Cl. ........................... 395/400; 364/DIG. 1; 364/243; 364/254; 364/252.3; 364/254.2; 364/258
[58] Field of Search ............................. 395/400, 425

[56] References Cited

U.S. PATENT DOCUMENTS

| | | | |
|---|---|---|---|
| 4,351,025 | 9/1982 | Hall, Jr. ........................... | 395/800 |
| 4,591,977 | 5/1986 | Nissen et al. ..................... | 395/800 |
| 4,644,461 | 2/1987 | Jennings ........................... | 395/200 |
| 4,667,308 | 5/1987 | Hayes et al. ...................... | 395/425 |
| 4,709,327 | 11/1987 | Hillis et al. ..................... | 395/425 |
| 4,803,621 | 2/1989 | Kelly ................................. | 395/425 |
| 5,008,852 | 4/1991 | Mizoguchi ........................ | 395/425 |
| 5,113,505 | 5/1992 | Holtz ................................. | 395/400 |
| 5,134,694 | 7/1992 | Jousselin et al. ................ | 395/400 |

Primary Examiner—Rebecca L. Rudolph
Attorney, Agent, or Firm—John D. Lewis; Jacob Shuster

[57] ABSTRACT

An m-dimensional memory with m-1 dimensional hyperplane access. Random access memory (RAM) circuits are arranged in a plurality of groups for storing data words corresponding to vertices of an m-dimensional lattice. Each vertex of the lattice is defined by an m-tuple. The minimum number of RAM circuits required to realize the memory architecture of the present invention is based upon the size of the lattice and the distribution of the data words in memory is based upon the m-tuples used to define the lattice.

4 Claims, 2 Drawing Sheets

M-DIMENSIONAL COMPUTER MEMORY WITH M-1 DIMENSIONAL HYPERPLANE ACCESS

ORIGIN OF THE INVENTION

The invention described herein was made in the performance of official duties by employees of the Department of the Navy and may be manufactured, used, licensed by or for the Government for any governmental purpose without payment of any royalties thereon.

BACKGROUND OF THE INVENTION (1) Field of the Invention

This invention relates generally to a computer memory and in particular to a m-dimensional computer memory with m−1 dimensional hyperplane access.

(2) Description of the Prior Art

Conventional computer memory is structurally linear in nature and its access can therefore only occur in a one directional linear manner. Thus, numerous accesses may be needed in order to reach required memory locations. Memory constructed in this way also has certain efficiency limitations in matrix and array processing applications. This is because software must be used to manipulate access data outside of memory in order to place it in proper form for processing and updating. In addition, when conventional memory is shared in a multiple processor environment, memory access control requires additional complexity in order to prevent access collision.

SUMMARY OF THE INVENTION

Accordingly, it is an object of the present invention to provide a computer memory whose memory locations can be accessed more quickly than conventional linear designs.

Another object of the present invention is to provide a computer memory compatible with both serial and parallel processing computers.

Other objects and advantages of the present invention will become more apparent hereinafter in the specification and drawings.

In accordance with the present invention, an m-dimensional computer memory has been designed for m−1 dimensional hyperplane access. Each stored L-bit data word corresponds to an m-tuple within an m-dimensional lattice space. Random access memory (RAM) circuits store the data words and are arranged in $n^{m-1}$ groups where n is equal to the number of data words in any of the m-dimensions. Each of the RAM circuits is capable of storing 1-bit. Each of the $n^{m-1}$ groups has L RAM circuits corresponding to an L-bit data word at a distinct RAM circuit address within each respective group. A data word for each of the $n^{m-1}$ groups may be simultaneously accessed from the RAM circuits as specified by $n^{m-1}$ address pairs that are based upon a 1-tuple hyperplane request. Each address pair specifies one of the $n^{m-1}$ groups and one RAM circuit address within each specified group. A bus interface control routes the simultaneous access to the RAM circuits based upon the $n^{m-1}$ address pairs. A processor, connected to the bus interface control, generates the $n^{m-1}$ address pairs from each of the data words' corresponding m-tuple within the m-dimensional lattice space. An input/output control connected to the processor, receives each 1-tuple hyperplane request and determines all m-tuples associated with that request which are in turn used to generate the $n^{m-1}$ address pairs.

DETAILED DESCRIPTION OF THE INVENTION

Figure 1:
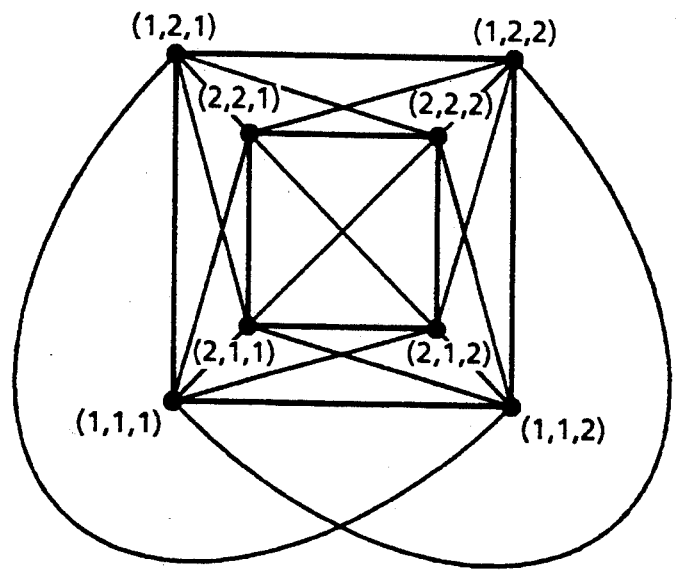
FIG. 1 is a 3-dimensional lattice space showing each of the m-tuples needed to describe the lattice space.

An m-dimensional memory is characterized as one in which each data word contains L-bits and corresponds to an m-tuple in the m-dimensional lattice space. In order to facilitate the description of the present invention, a 3-dimensional lattice space is shown in FIG. 1. The choice of m=3 is only for ease of description as m may be any positive integer greater than 1. Each of the vertices in the lattice space are defined by an m-tuple or, in the case of FIG. 1, a 3-tuple that defines each vertex position in terms of the x, y and z-axes respectively. Each vertex contains one L-bit data word. Thus, there are 8 data words stored in the lattice space of FIG. 1.

Each axis in the lattice space has a number of vertices $n_x$, $n_y$, and $n_z$ along each respective axis. In order to design the memory of the present invention with a fixed data bus bandwidth, the number of vertices $n_x=n_y=n_z=n$. Thus, each 3-dimensional lattice space will always be a cube for purposes of the 3-dimensional memory. For the case shown in FIG. 1, n=2.

Each face of the cube shown in FIG. 1 maintains one axis as a constant. For example, the face defined by vertices (1,1,1), (2,1,1), (2,1,2) and (1,1,2) maintains y=1 as a constant. The expression "y=1" is defined as the 1-tuple that refers to four data words residing at the four vertices. Each face residing in 2-dimensional space is defined as a 2-dimensional hyperplane. Generalizing for an m-dimensional lattice space, it can be seen that any 1-tuple refers to an m−1 dimensional hyperplane.

In order to realize a random access memory (RAM) for the m-dimensional lattice space, the data words corresponding to the vertices in the lattice space must be distributed over a collection of RAM circuits. The apparatus and method of the present invention used to distribute the data words is such that any m−1 dimensional hyperplane of words can be reached via a single memory access. The realization of such a memory is shown schematically in FIG. 2 and is designated generally by numeral 10. For sake of simplicity, the 3-dimensional lattice space of FIG. 1 is realized in the memory of FIG. 2 for 1-bit data words. However, any m-dimensional lattice space may be realized in memory for L-bit data words according to the apparatus and method of the present invention.

Figure 2:
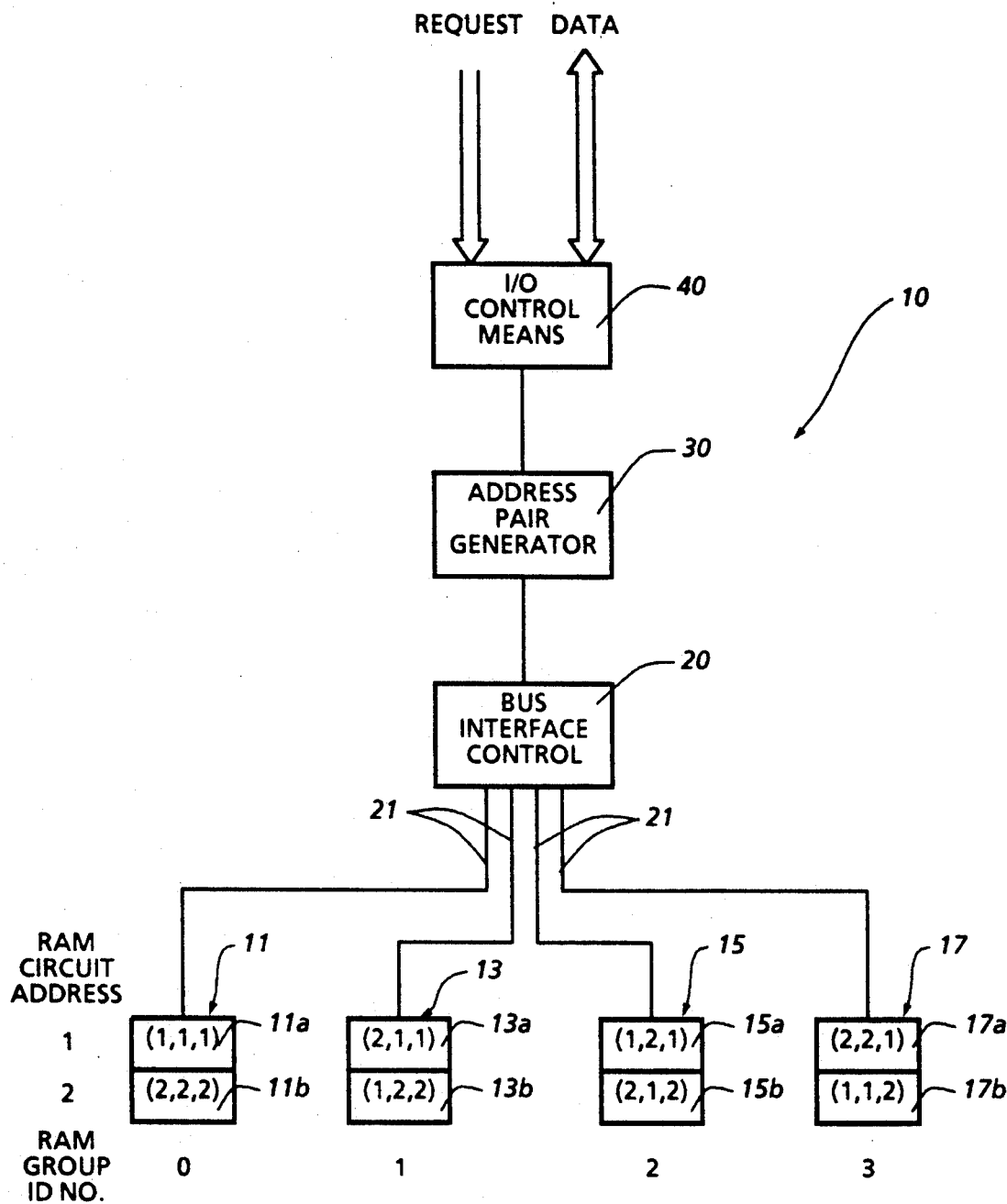
FIG. 2 is a schematic representation of an m-dimensional memory having m−1 dimensional hyperplane access according to the present invention.

As shown in FIG. 2, memory 10 has four groups 11, 13, 15 and 17 of RAM circuits 11a, 11b, 13a, 13b, etc. Each RAM group has a RAM group identification (ID) number. RAM group 11 is defined as RAM ID 0, RAM group 13 is defined as RAM ID 1, etc. In general, the number of RAM groups required to realize an m-dimensional memory having m−1 dimensional hyperplane access is $n^{m-1}$. In the instant case, since n=2 and m=3, four RAM groups are required as shown in FIG. 2.

Figure 3:
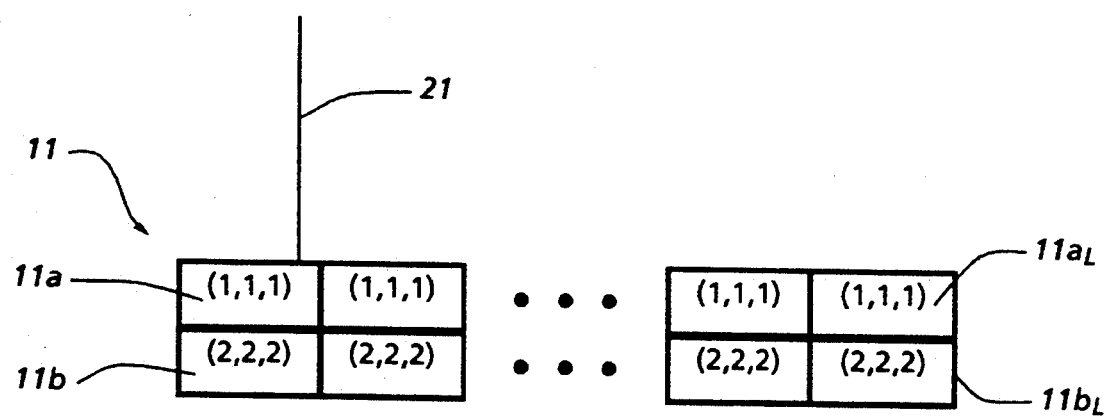
FIG. 3 is a schematic representation of one RAM group used for storing an L-bit data word.

Each RAM group 11, 13, 15 and 17 stores a data word from the m-diaensional lattice at a particular RAM circuit address. For ease of description, memory 10 is being described for data words consisting of 1-bit. Each RAM circuit 11a, 11b, 13a, 13b etc. is capable of storing 1-bit of data and may be a single port or multi-port device. However, each data word may contain up to L-bits in which case such RAM groups 11, 13, 15 and 17 would contain L RAM circuits at each RAM circuit address as shown by way of example for RAM group 11 in FIG. 3.

In order to access the location of each data word in memory 10, a bus interface control means 20 routes and passes data and RAM circuit addresses to the appropriate RAM groups 11, 13, 15 and 17, across address and bus lines 21 as dictated by the address pairs provided to it by address pair generator 30. Each address pair points to a particular RAM group and RAM circuit address within that group which define a vertex in the m-dimensional lattice. For example, the data word residing at vertex (2,2,2) is stored at RAM ID 0 and RAM circuit address 2.

Bus interface control means 20 is typically any conventional bus interface that allows for bi-directional flow of address and data information across bus and address lines 21. Operationally, if the request for access is a "read", then bus interface control means 20 sends a read request for each L-bit of data along with the appropriate RAM circuit address to the appropriate RAM groups. If the request for access is a "write", then control means 20 sends a write request with each L-bit of data along with the appropriate RAM circuit address to the appropriate RAM groups.

Each address pair is generated by an address pair generator 30 which is typically a high-speed processing unit. Address pair generator 30, or processor, as it will be referred to hereinafter, generates each address pair associated with each 1-tuple hyperplane request. Processor 30 utilizes two algorithms to define the RAM ID and RAM circuit address of each address pair based upon the m-tuple. Since each 1-tuple hyperplane request is defined by $n^{m-1}$ vertices in the m-dimensional lattice space, processor 30 must generate $n^{m-1}$ address pairs for each 1-tuple hyperplane request.

Finally, an input/output (I/O) control means 40, electrically connected to the processor 30, is used to receive requests for access and to determine all m-tuples to be used by processor 30. I/O control means 40 may be any conventional I/O control. Operationally, I/O control means 40 receives a request for access and decodes the request into a 1-tuple read or 1-tuple write request. All m-tuples associated with the 1-tuple read/write request are then passed to processor 30 in order to generate the aforementioned address pairs.

The two algorithms used by processor 30 will now be described with the aid of the 3-dimensional lattice and memory shown in FIGS. 1 and 2, respectively. In order to determine which RAM group is associated with a particular m-tuple, the following group control algorithm is applied:

$$\sum_{i=0}^{m-2} n^i \mathrm{mod}(t_m + t_{i+1}, n)$$

where $t_m$ is the m-th coordinate of each m-tuple and $t_{i+1}$ is the i+1 coordinate of each m-tuple. For each of the m-tuples in the instant case, the RAM ID numbers are calculated in TABLE 1.

TABLE 1

| (x,y,z) | $\sum_{i=0}^{m-2} n^i \mathrm{mod}(t_m + t_{i+1}, n)$ |
|---|---|
| (1,1,1) | mod (2,2) +2 mod (2,2) = 0 |
| (1,1,2) | mod (3,2) +2 mod (3,2) = 1 + 2 = 3 |
| (1,2,2) | mod (3,2) +2 mod (4,2) = 1 + 0 = 1 |
| (1,2,1) | mod (2,2) +2 mod (3,2) = 0 + 2 = 2 |
| (2,1,1) | mod (3,2) +2 mod (2,2) = 1 + 0 = 1 |
| (2,1,2) | mod (4,2) +2 mod (3,2) = 0 + 2 = 2 |
| (2,2,2) | mod (4,2) +2 mod (4,2) = 0 + 0 = 0 |
| (2,2,1) | mod (3,2) +2 mod (3,2) = 1 + 2 = 3 |

In general, the address control algorithm sets up the distribution of all data words in the m-dimensional lattice amongst the $n^{m-1}$ groups of RAM in order to achieve m−1 dimensional hyperplane access. Thus, the RAM ID portion of the address pair is generated by processor 30 with the aid of the group control algorithm.

Next, in order to determine which RAM circuit address within each RAM group is associated with the particular m-tuple, the following address control algorithm is applied:

$$\left\lceil \frac{t_1 + \sum_{i=1}^{m-1} (t_{i+1} - 1)n^i}{n^{m-1}} \right\rceil$$

where ⌈ ⌉ denotes the smallest integer greater than or equal to the argument enclosed within ⌈ ⌉ and $t_1$ is the first coordinate of each m-tuple. For each of the m-tuples in the instant case, the RAM circuit addresses are calculated in TABLE 2.

TABLE 2

| (x,y,z) | $\dfrac{t_1 + \sum_{i=1}^{m-1} (t_{i+1} - 1)n^i}{n^{m-1}}$ | $\left\lceil \dfrac{t_1 + \sum_{i=1}^{m-1} (t_{i+1} - 1)n^i}{n^{m-1}} \right\rceil$ |
|---|---|---|
| (1,1,1) | 1/4 | 1 |
| (1,1,2) | 5/4 | 2 |
| (1,2,2) | 7/4 | 2 |
| (1,2,1) | 3/4 | 1 |
| (2,1,1) | 2/4 | 1 |
| (2,1,2) | 6/4 | 2 |
| (2,2,2) | 8/4 = 2 | 2 |
| (2,2,1) | 4/4 = 1 | 1 |

In general, the address control algorithm sets up the distribution of all data words in the m-dimensional lattice amongst the RAM circuit addresses of each of the $n^{m-1}$ groups in order to achieve m−1 dimensional hyperplane access. Thus, the RAM circuit address portion of the address pair is generated by processor 30 with the aid of the address control algorithm.

In order to demonstrate the m−1 dimensional hyperplane access of memory according to the present invention, TABLE 3 shows which data words would be accessed for each of the six 1-tuple request possibilities for the instant case. Note that since there are six "faces" in the cube of FIG. 1, there are six hyperplanes that can be accessed.

| Dimension Request Integer | | | Words to be Accessed in 2-Dimensional Hyperplane of Memory |
|---|---|---|---|
| x | y | z | |

-continued

| Dimension Request Integer | | | Words to be Accessed in 2-Dimensional Hyperplane of Memory | | | |
|---|---|---|---|---|---|---|
| 1 | | | (1,1,1) | (1,1,2) | (1,2,1) | (1,2,2) |
| 2 | | | (2,1,1) | (2,1,2) | (2,2,1) | (2,2,2) |
| | 1 | | (1,1,1) | (2,1,1) | (1,1,2) | (2,1,2) |
| | 2 | | (1,2,1) | (2,2,1) | (1,2,2) | (2,2,2) |
| | | 1 | (1,1,1) | (2,1,1) | (1,2,1) | (2,2,1) |
| | | 2 | (1,1,2) | (2,1,2) | (1,2,2) | (2,2,2) |

While the present invention has been described for a single 3-dimensional "cube" it is not limited thereto. Indeed, since a RAM group is typically 256 k bits deep as well as L-bits wide, many of the 3-dimensional "cubes" can fit into the four RAM group memory. Accordingly, an additional integer could be passed with each 1-tuple request. The additional integer would specify how deep to access into each RAM group for the correct RAM circuit address. Letting C be equal to the cube ID, the address control algorithm becomes $$2(C-1) + \left[ \frac{t_1 + \sum_{i=1}^{m-1}(t_{i+1}-1)n^i}{n^{m-1}} \right]$$

which is then applied in TABLE 2 to generate the RAM circuit addresses associated with each cube C. For the general case of an m-dimensional memory having C repetitions of the m-dimensional structure, the RAM circuit address is increased by $n(C-1)$ for each structure C.

The advantages of the present invention are numerous. The m-dimensional memory architecture with $m-1$ dimensional hyperplane access will find great utility in both serial and parallel processing computers. By providing a specialized storage/retrieval media, the present invention can efficiently service associated computational processes with $m-1$ dimensional hyperplanes of data. These hyperplanes of data may be accessed in fewer accesses that are required by conventional computer memory.

Thus, although the invention has been described relative to specific embodiments thereof it is not so limited and numerous variations and modifications thereof will be readily apparent to those skilled in the art in light of the above teaching. It is therefore to be understood that within the scope of the appended claims the invention may be practiced otherwise than as specifically described.

What is claimed is:

1. An m-dimensional computer memory in which each L-bit data word corresponds to an m-tuple within an m-dimensional lattice space, and in which $m-1$ dimensional hyperplane access is available for any 1-tuple hyperplane request, comprising:

memory means for storing said data words, said memory means comprising random access memory (RAM) circuits arranged in $n^{m-1}$ groups where n is equal to the number of data words in any of the m dimensions, each of said RAM circuits storing 1-bit and each of said $n^{m-1}$ groups having L RAM circuits corresponding to said L-bit data word at a distinct RAM circuit address within each of said $n^{m-1}$ groups wherein, based upon said 1-tuple hyperplane request, a data word from each of the $n^{m-1}$ groups is simultaneously accessed as specified by $n^{m-1}$ address pairs, each of said address pairs specifying one of said $n^{m-1}$ groups and one RAM circuit address within said specified group;

bus interface control mens electrically connected to said memory means for routing said simultaneous access to said RAM circuits based upon said $n^{m-1}$ address pairs;

address generation means electrically connected to said bus interface control mens for generating each of said $n^{m-1}$ address pairs from each of the said data words' m-tuple, said address generation means comprising a processor controlled by an operating system of instructions executed by said processor, wherein said processor generates said specified group according to a group control instruction $$\sum_{i=0}^{m-2} n^i \mathrm{mod}(t_m + t_{i+1}, n)$$

and generates said RAM circuit address according to an address control instruction $$\left[ \frac{t_1 + \sum_{i=1}^{m-1}(t_{i+1}-1)n^i}{n^{m-1}} \right]$$

wherein $t_1$ is the first coordinate, $t_m$ is the m-th coordinate and $t_{i+1}$ is the $(i+1)$ coordinate in each of said m-tuples; and input/output (I/O) control means electrically connected to said address generation means for receiving a 1-tuple hyperplane request and for determining all m-tuples associated with said 1-tuple hyperplane request whereby said data words are arranged in said memory means to be accessible in $m-1$ dimensional hyperplanes, wherein said processor receives, from said I/O control means, said all m-tuples associated with said 1tuple hyperplane request and generates said specified group and RAM circuit address associated with each of said all m-tuples.

2. An m-dimensional computer memory as in claim 1 wherein said RAM circuits are single port RAM circuits.

3. An m-dimensional computer memory as in claim 1 further comprising C repetitions of said memory means electrically connected in series with one another wherein said processor generated RAM circuit address is increased by $n(C-1)$.

4. A method for accessing an m-dimensional computer memory in which each L-bit data word corresponds to an m-tuple within an m-dimensional lattice space, and in which $m-1$ dimensional hyperplane access is available for any 1-tuple hyperplane request, comprising the steps of:

storing said data words in a memory means, said memory means including random access memory (RAM) circuits arranged in $n^{m-1}$ groups where n is equal to the number of data words in any of the m-dimensions, each of said RAM circuits storing 1-bit and each of said $n^{m-1}$ groups having L RAM circuits corresponding to said L-bit data word at a distinct RAM circuit address within each of said $n^{m-1}$ groups wherein, based upon said 1-tuple hyperplane request, a data word from each of the $n^{m-1}$ groups is simultaneously accessed as specified by $n^{m-1}$ address pairs, each of said address pairs specifying one of said $n^{m-1}$ groups and one RAM circuit address within said specified group;

determining all m-tuples associated with said 1-tuple hyperplane request;

generating said specified group according to a group control instruction $$\sum_{i=0}^{m-2} n^i \mathrm{mod}(t_m + t_{i+1}, n);$$

generating said RAM circuit address according to an address control instruction $$\left\lceil \frac{t_1 + \sum_{i=1}^{m-1} (t_{i+1} - 1)n^i}{n^{m-1}} \right\rceil$$

wherein $t_1$ is the first coordinate, $t_m$ is the m-th coordinate and $t_{i+1}$ is the (i+1) coordinate in each of said m-tuples; and accessing said memory means based upon said generated address pairs.

* * * * *